(12) United States Patent
Ryan

(10) Patent No.: US 10,264,781 B2
(45) Date of Patent: Apr. 23, 2019

(54) SOLAR POWERED SPRAYING ASSEMBLY

(71) Applicant: Michael Ryan, Stanhope, NJ (US)

(72) Inventor: Michael Ryan, Stanhope, NJ (US)

( * ) Notice: Subject to any disclaimer, the term of this patent is extended or adjusted under 35 U.S.C. 154(b) by 439 days.

(21) Appl. No.: 14/923,891

(22) Filed: Oct. 27, 2015

(65) Prior Publication Data

US 2017/0112121 A1  Apr. 27, 2017

(51) Int. Cl.
| | |
|---|---|
| *A01M 29/00* | (2011.01) |
| *A01M 29/12* | (2011.01) |
| *B05B 1/00* | (2006.01) |
| *B05B 9/04* | (2006.01) |
| *B05B 12/12* | (2006.01) |
| *H02S 20/30* | (2014.01) |
| *H02S 20/10* | (2014.01) |
| *B05B 15/625* | (2018.01) |
| *B05B 15/68* | (2018.01) |
| *B05B 15/622* | (2018.01) |

(52) U.S. Cl.
CPC .............. *A01M 29/12* (2013.01); *B05B 1/00* (2013.01); *B05B 9/0426* (2013.01); *B05B 12/122* (2013.01); *B05B 15/622* (2018.02); *B05B 15/625* (2018.02); *B05B 15/68* (2018.02); *H02S 20/10* (2014.12); *H02S 20/30* (2014.12)

(58) Field of Classification Search
CPC ........ A01M 29/12; H02S 20/30; A01N 63/02; B05B 1/00; B05B 9/0426; B05B 12/122; B05B 15/062; B05B 15/063; B05B 15/08; B05B 15/10; F21S 9/046; F21S 10/002; F21V 3/00; F21V 33/006; F21Y 2115/10

USPC ................. 239/276, 289, 302, 349
See application file for complete search history.

(56) References Cited

U.S. PATENT DOCUMENTS

| | | | | |
|---|---|---|---|---|
| 3,675,360 | A * | 7/1972 | Pierce ................. | A01M 1/2077 392/342 |
| 4,185,581 | A | 1/1980 | Tilton | |
| 4,697,739 | A * | 10/1987 | McCracken ........ | A01M 7/0092 137/565.3 |
| 4,908,501 | A * | 3/1990 | Arnold, III ............ | A01K 7/027 119/73 |
| 4,996,521 | A | 2/1991 | Hollow | |
| 5,249,718 | A * | 10/1993 | Muderlak .............. | G04C 23/38 222/1 |
| 5,449,117 | A * | 9/1995 | Muderlak .............. | A47K 17/00 222/646 |
| 5,501,179 | A | 3/1996 | Cory | |
| 5,528,220 | A | 6/1996 | Woods | |
| 5,603,287 | A | 2/1997 | Houck | |
| 5,746,375 | A * | 5/1998 | Guo ...................... | B05B 15/622 239/245 |
| 5,967,416 | A * | 10/1999 | Barbour ................. | B05B 15/74 239/205 |
| 6,029,898 | A * | 2/2000 | Dupre ...................... | F25C 3/04 239/14.2 |
| 6,216,925 | B1 * | 4/2001 | Garon ................. | B65D 83/205 222/645 |

(Continued)

*Primary Examiner* — Chee-Chong Lee
*Assistant Examiner* — Viet Le

(57) ABSTRACT

A solar powered spraying assembly for spraying a rodent repellent over an area includes a spraying unit that may contain a fluid. Thus, the spraying unit may spray the fluid over a selected area. A support is provided and the support may engage a support surface. The spraying unit is removably coupled to the support. Thus, the support may support the spraying unit above the support surface.

8 Claims, 4 Drawing Sheets

(56) References Cited

U.S. PATENT DOCUMENTS

| | | | |
|---|---|---|---|
| 6,254,065 B1* | 7/2001 | Ehrensperger | A61L 9/122 261/26 |
| 6,267,297 B1* | 7/2001 | Contadini | A61L 9/12 222/646 |
| 6,375,090 B1* | 4/2002 | Beidokhti | B05B 17/08 239/16 |
| 6,409,093 B2 | 6/2002 | Ulczynski | A01M 1/2016 222/399 |
| 6,540,155 B1* | 4/2003 | Yahav | B65D 83/262 239/573 |
| 6,592,049 B1* | 7/2003 | Wolput | B05B 1/202 239/70 |
| 6,592,104 B2* | 7/2003 | Cox | A01M 1/2033 261/26 |
| 6,756,578 B1* | 6/2004 | Kaiser | H03F 3/08 250/214 A |
| 6,966,500 B1* | 11/2005 | Kelley | A01M 31/008 239/34 |
| 7,025,879 B1* | 4/2006 | Ticknor | E03B 3/03 210/232 |
| 7,066,197 B1* | 6/2006 | Gray | E03B 1/04 137/357 |
| 7,090,147 B2* | 8/2006 | Lovett | A01M 1/2038 239/332 |
| 7,108,199 B1* | 9/2006 | Brown | A01M 1/2038 222/642 |
| 7,278,375 B2* | 10/2007 | Ross | A01K 15/02 116/22 A |
| 7,309,926 B2* | 12/2007 | Watt | F04B 17/006 290/1 R |
| 7,334,744 B1* | 2/2008 | Dawson | A01G 13/065 239/373 |
| 7,690,146 B2 | 4/2010 | Jong et al. | |
| D634,417 S * | 3/2011 | Abbondanzio | D23/366 |
| 8,430,337 B2* | 4/2013 | Pearce, III | A01G 13/06 239/457 |
| 8,889,082 B2* | 11/2014 | Muderlak | A61L 9/122 222/1 |
| 9,453,330 B2* | 9/2016 | Muderlak | A61L 9/122 |
| 9,819,305 B2* | 11/2017 | Blick | H02S 40/38 |
| 2003/0020185 A1* | 1/2003 | Cox | A01M 1/2033 261/26 |
| 2005/0184203 A1* | 8/2005 | Votypka | B05B 15/622 248/87 |
| 2005/0211796 A1* | 9/2005 | Lovett | A01M 1/2038 239/332 |
| 2005/0224596 A1* | 10/2005 | Panopoulos | A01M 1/2038 239/67 |
| 2005/0284951 A1* | 12/2005 | Clarke, III | B05B 7/2416 239/8 |
| 2006/0032104 A1* | 2/2006 | Brunner | A01M 31/06 43/2 |
| 2006/0048800 A1* | 3/2006 | Rast | A47L 1/02 134/56 R |
| 2006/0086824 A1* | 4/2006 | Pearce, III | A01G 13/06 239/337 |
| 2006/0213449 A1 | 9/2006 | Dodge | |
| 2007/0095941 A1* | 5/2007 | Gorres | A01M 1/2044 239/337 |
| 2007/0199952 A1* | 8/2007 | Carpenter | A61L 9/14 222/52 |
| 2008/0203186 A1* | 8/2008 | Grocke | B05B 1/202 239/70 |
| 2008/0210772 A1* | 9/2008 | Pearce | A01G 13/06 239/67 |
| 2009/0152380 A1* | 6/2009 | Houseknecht | B05B 3/0486 239/390 |
| 2009/0179759 A1* | 7/2009 | Koury | A01M 29/06 340/557 |
| 2010/0084491 A1* | 4/2010 | Williams | A01C 23/042 239/276 |
| 2010/0096471 A1* | 4/2010 | Djordjic | A01M 29/12 239/67 |
| 2010/0193599 A1* | 8/2010 | Butler | A01M 1/2038 239/1 |
| 2010/0224697 A1* | 9/2010 | Modlin | A01M 1/205 239/102.1 |
| 2010/0303654 A1* | 12/2010 | Petersen | F04B 35/06 417/423.7 |
| 2011/0226868 A1* | 9/2011 | Modlin | A01M 1/205 239/102.1 |
| 2011/0315790 A1* | 12/2011 | Orubor | A01C 23/047 239/310 |
| 2014/0061325 A1* | 3/2014 | Crivello | A01C 7/06 239/1 |
| 2014/0263426 A1* | 9/2014 | Gasper | B05B 12/081 222/52 |
| 2014/0312142 A1* | 10/2014 | Lovett | B05B 9/0403 239/146 |
| 2014/0361101 A1* | 12/2014 | Maher | F24F 6/14 239/302 |
| 2014/0362560 A1* | 12/2014 | Formico | A01M 1/04 362/96 |
| 2015/0359228 A1* | 12/2015 | Grasso | A01K 1/08 43/113 |

* cited by examiner

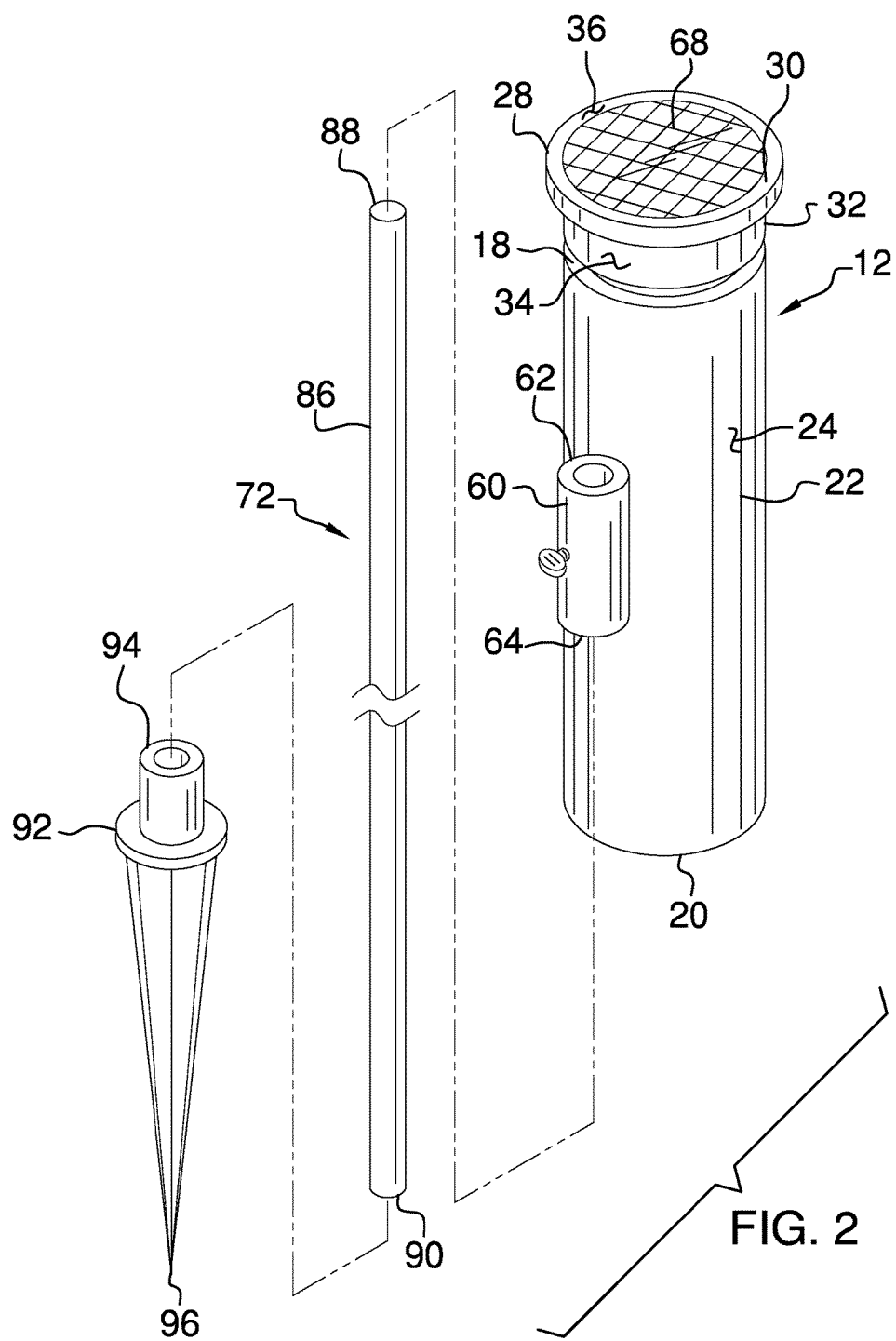

SOLAR POWERED SPRAYING ASSEMBLY

BACKGROUND OF THE DISCLOSURE

Field of the Disclosure

The disclosure relates to spraying devices and more particularly pertains to a new spraying device for spraying a rodent repellent over an area.

SUMMARY OF THE DISCLOSURE

An embodiment of the disclosure meets the needs presented above by generally comprising a spraying unit that may contain a fluid. Thus, the spraying unit may spray the fluid over a selected area. A support is provided and the support may engage a support surface. The spraying unit is removably coupled to the support. Thus, the support may support the spraying unit above the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a perspective exploded view of an embodiment of the disclosure.

DESCRIPTION OF THE PREFERRED EMBODIMENT

Figure 1:
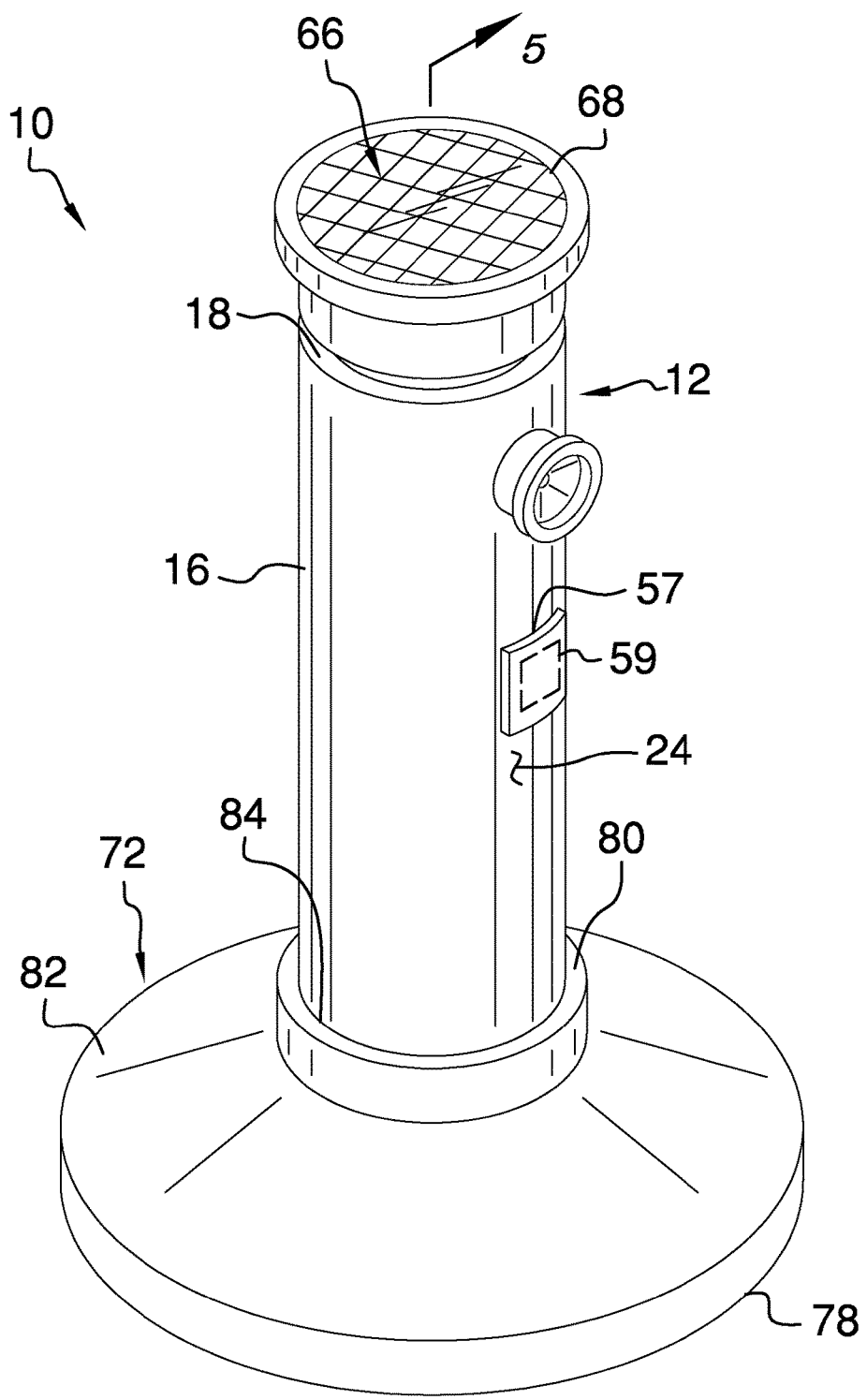
FIG. 1 is a top perspective view of a solar powered spraying assembly according to an embodiment of the disclosure.
Figure 4:
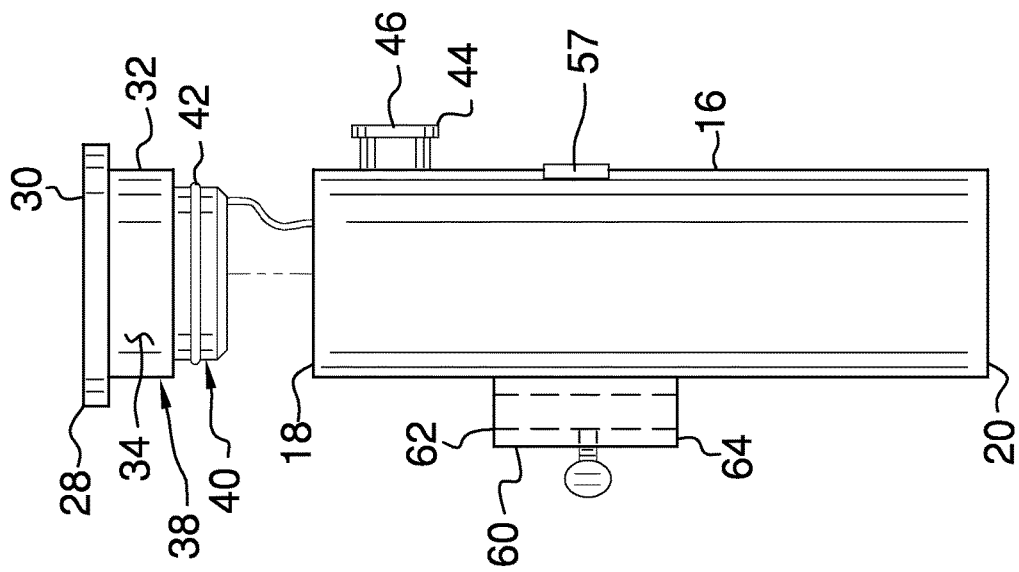
FIG. 4 is a right side view of an embodiment of the disclosure.
Figure 3:
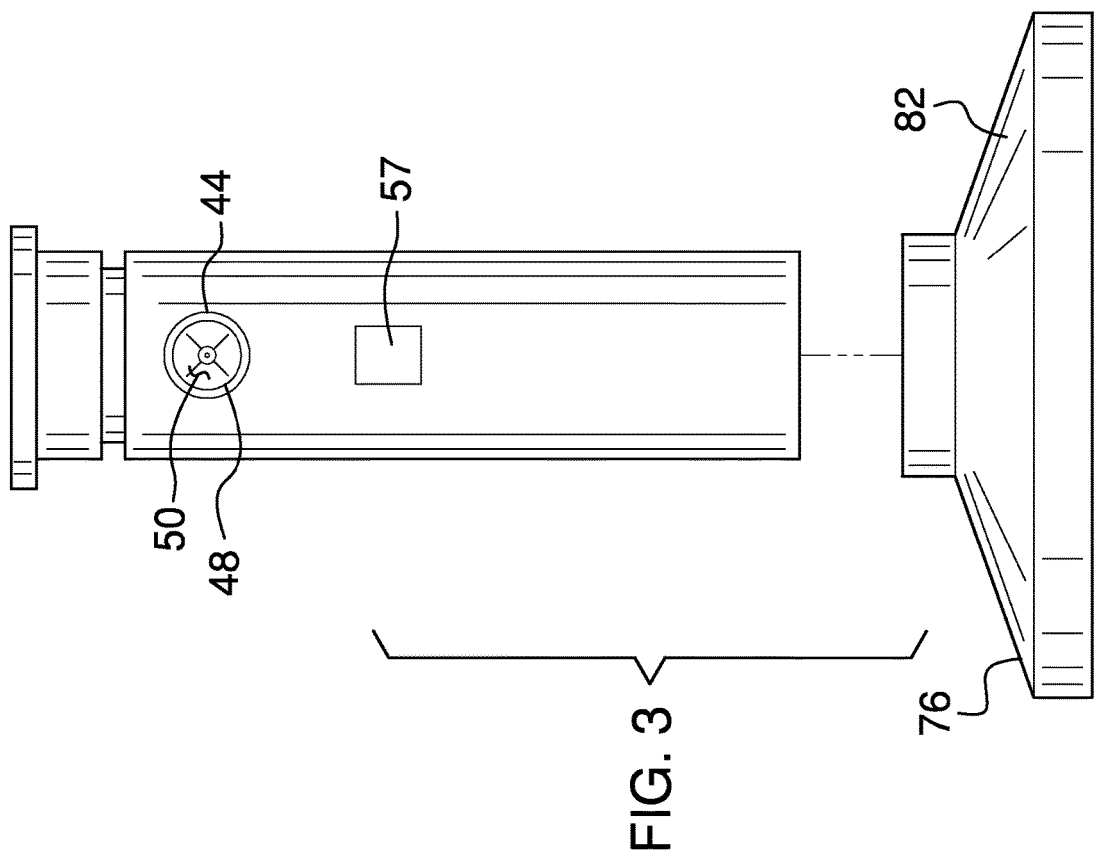
FIG. 3 is a front view of an embodiment of the disclosure.
Figure 5:
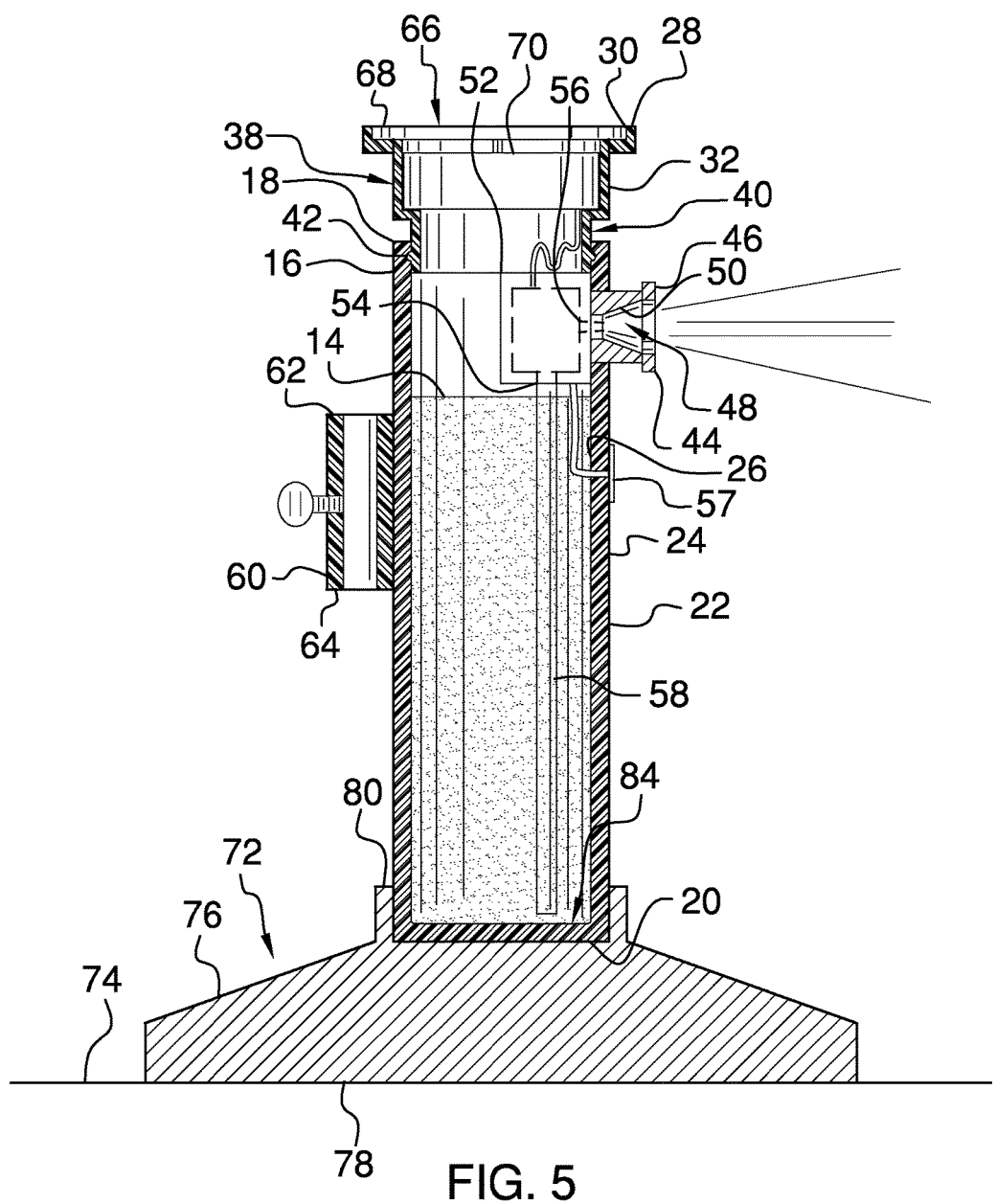
FIG. 5 is a cross sectional view taken along line 5-5 of FIG. 1 of an embodiment of the disclosure.

With reference now to the drawings, and in particular to FIGS. 1 through 5 thereof, a new spraying device embodying the principles and concepts of an embodiment of the disclosure and generally designated by the reference numeral 10 will be described.

As best illustrated in FIGS. 1 through 5, the solar powered spraying assembly 10 generally comprises a spraying unit 12 that may contain a fluid 14. The spraying unit 12 sprays the fluid 14 over a selected area. The fluid 14 may comprise coyote urine or other similar fluid utilized in the convention of rodent repellent. The area may comprise a garden, a lawn or other area utilized in the convention of agriculture.

The spraying unit 12 comprises a cylinder 16 has a top end 18, a bottom end 20 and an outer wall 22 extending between the top end 18 and the bottom end 20. The top end 18 is open and the cylinder 16 is substantially hollow. Thus, the cylinder 16 may contain the fluid 14. The outer wall 22 has an outer surface 24 and an inner surface 26.

A cap 28 is provided that has a top wall 30 and a peripheral wall 32 extending downwardly from the top wall 30. The peripheral wall 32 is curved such that the cap 28 has a cylindrical shape. The peripheral wall 32 has an exterior surface 34 and the top wall 30 has a top surface 36. The exterior surface 34 has a first portion 38 and a distal portion 40 with respect to the top wall 30.

The distal portion 40 is inset with respect to the first portion 38 and the distal portion 40 has a lip 42 extending outwardly therefrom. The lip 42 is continuous such that the lip 42 extends around an entire circumference of the distal portion 40. The cap 28 is positionable within the top end 18 having the exterior surface 34 corresponding to the distal portion 40 frictionally engaging the inner surface 26 of the cylinder 16. The lip 42 engages the inner surface 26 such that the cap 28 is removably retained on the cylinder 16.

A nozzle 44 is coupled to the outer surface 24 of the cylinder 16. The nozzle 44 has a distal end 46 with respect to the outer surface 24. The distal end 46 has a well 48 extending inwardly toward the cylinder 16. The well 48 has a bounding surface 50 and the bounding surface 50 tapers inwardly between the distal end 46 and the cylinder 16.

A pump 52 is coupled to the inner surface 26 of the cylinder 16 and the pump 52 has an inlet 54 and an outlet 56. The inlet 54 has a pipe 58 extending downwardly therefrom and the pipe 58 is submerged in the fluid 14. Thus, the pump 52 may urge the fluid 14 upwardly through the pipe 58. The outlet 56 is fluidly coupled to the well 48 in the nozzle 48 thereby facilitating the pump 52 to urge the fluid 14 outwardly from the nozzle 48.

A motion sensor 57 is coupled to the outer surface 24 of the cylinder 16. Thus, the motion sensor 57 detects motion proximate the cylinder 16. The motion sensor 57 is electrically coupled to the pump 52. The motion sensor 57 turns the pump 52 on when the motion sensor 57 detects the motion. The motion sensor 57 may comprise an electronic motion sensor or the like and the motion sensor 57 includes a processor 59.

A mount 60 is coupled to the outer surface 24 of the cylinder 16. The mount 60 is centrally positioned on the cylinder 16. The mount 60 has an upper end 62 and a lower end 64. Each of the upper end 62 and the lower end 64 are open and the mount 60 is substantially hollow.

A power supply 66 is coupled to the cap 28 and the power supply 66 is electrically coupled to the pump 52. The power supply 66 comprises a solar panel 68 that is coupled to the top surface 36 of the cap 28. Thus, the solar panel 68 may be exposed to solar energy. The power supply 66 further includes a battery 70 that is positioned within the cap 28. The battery 70 is electrically coupled to the solar panel 68 such that the solar panel 68 charges the battery 70. The battery 70 is electrically coupled to the pump 52.

A support 72 is provided and the support 72 may engage a support surface 74. The support surface 74 may be ground. The spraying unit 12 is removably coupled to the support 72. Thus, the spraying unit 12 is supported above the support surface 74.

The support 72 comprises a base 76 that has a bottom side 78, a top side 80 and an outermost wall 82 extending between the bottom side 78 and the top side 80. The outermost wall 82 flares outwardly between the top side 80 and the bottom side 78. The top side 80 has a well 84 extending downwardly therein. The well 84 in the base 76 insertably receives the bottom end 20 of the cylinder 16 such that the cylinder 16 extends upwardly from the base 76. The bottom side 78 may abut the support surface 74.

A pole 86 is provided that has a first end 88 and a second end 90. The first end 88 of the pole 86 is insertable lower end 64 of the mount 60 such that the cylinder 16 is positionable at a selected point along the pole 86. A spike 92 is provided that has an uppermost end 94 and a lowermost end 96. The spike 92 tapers between the uppermost end 94 and the lowermost end 96 such that the lowermost end 96 may penetrate the support surface 74. The uppermost end 94 insertably receives the second end 90 of the pole 86. Thus, the cylinder 16 is spaced above the support surface 74 when the cylinder 16 is not positioned within the base 76.

In use, the cylinder 16 is filled with the fluid 14 and the cap 28 is positioned on the cylinder 16. The cylinder 16 is positioned on a selected one of the base 76 or the pole 86. The cylinder 16 is positioned on the pole 86 to increasing a distance that the fluid 14 is sprayed from the cylinder 16. The pump 52 continuously urges the fluid 14 outwardly from the nozzle 48. The cylinder 16 is re-filled with the fluid 14 when the fluid 14 is depleted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A solar powered spraying assembly comprising:
   a spraying unit being configured to contain a fluid thereby facilitating said
   spraying unit to spray the fluid over a selected area, said spraying unit being a cylinder having a top end, a bottom end and an outer wall extending between said top end and said bottom end, said top end being open, said cylinder being substantially hollow wherein said cylinder is configured to contain the fluid, said outer wall having an outer surface and an inner surface;
   a nozzle being coupled to said outer surface of said cylinder between said top end and said bottom end, said nozzle having a distal end with respect to said outer surface, said distal end having a well extending inwardly toward said cylinder, said well having a bounding surface, said bounding surface tapering inwardly between said distal end and said cylinder;
   a pump being coupled to said inner surface of said cylinder between said top end and said bottom end whereby said pump is positioned within said cylinder, said pump having an inlet and an outlet, said inlet having a pipe extending downwardly therefrom wherein said pump is configured to urge the fluid upwardly through said pipe, said outlet being fluidly coupled to said well in said nozzle thereby facilitating said pump to urge the fluid outwardly from said nozzle;
   a mount being coupled to said outer surface of said cylinder, said mount being centrally positioned on said cylinder, said mount having an upper end and a lower end, each of said upper end and said lower end being open, said mount being substantially hollow; and
   a support being configured to engage a support surface, said spraying unit being removably coupled to said support wherein said support is configured to support said spraying unit above the support surface, said support comprising:
   a base having a bottom side, a top side and an outermost wall extending between said bottom side and said top side, said outermost wall flaring outwardly between said top side and said bottom side, said top side having a well extending downwardly therein, said well in said base insertably receiving said bottom end of said cylinder such that said cylinder extends upwardly from said base, said bottom side being configured to a but the support surface,
   a pole having a first end and a second end, said first end of said pole being insertable into said mount on said cylinder such that said cylinder is positionable at a selected point along said pole.

2. The assembly according to claim 1, further comprising a cap having a top wall and a peripheral wall extending downwardly from said top wall, said peripheral wall being curved such that said cap has a cylindrical shape, said peripheral wall having an exterior surface, said top wall having a top surface.

3. The assembly according to claim 2, wherein said exterior surface has a first portion and a distal portion with respect to said top wall, said distal portion being inset with respect to said first portion, said distal portion having a lip extending outwardly therefrom, said lip being continuous such that said lip extends around an entire circumference of said distal portion.

4. The assembly according to claim 3, wherein said cap being positionable within said top end having said exterior surface corresponding to said distal portion frictionally engaging said inner surface of said cylinder, said lip engaging said inner surface such that said cap is removably retained on said cylinder.

5. The assembly according to claim 3, further comprising a power supply being coupled to said cap, said power supply being electrically coupled to said pump, said power supply comprising:
   a solar panel being coupled to said top surface of said cap wherein said solar panel is configured to be exposed to solar energy; and
   a battery being positioned within said cap, said battery being electrically coupled to said solar panel such that said solar panel charges said battery, said battery being electrically coupled to said pump.

6. The assembly according to claim 1, wherein: said cylinder has a bottom end; and said top side has a well extending downwardly therein, said well in said base insertably receiving said bottom end of said cylinder such that said cylinder extends upwardly from said base, said bottom side being configured to abut the support surface.

7. The assembly according to claim 1, further comprising a spike having an uppermost end and a lowermost end, said spike tapering between said uppermost end and said lowermost end wherein said lowermost end is configured to penetrate the support surface, said uppermost end insertably receiving said second end of said pole such that said cylinder is configured to be spaced above the support surface when said cylinder is not positioned within a base.

8. A solar powered spraying assembly comprising:
   a spraying unit being configured to contain a fluid thereby facilitating said spraying unit to spray the fluid over a selected area, said spraying unit comprising:
      said spraying unit being a cylinder having a top end, a bottom end and an outer wall extending between said top end and said bottom end, said top end being open, said cylinder being substantially hollow wherein said cylinder is configured to contain the fluid, said outer wall having an outer surface and an inner surface,
      a cap having a top wall and a peripheral wall extending downwardly from said top wall, said peripheral wall being curved such that said cap has a cylindrical shape, said peripheral wall having an exterior surface, said top wall having a top surface, said exterior surface having a first portion and a distal portion with respect to said top wall, said distal portion being inset with respect to said first portion, said distal portion having a lip extending outwardly therefrom, said lip being continuous such that said lip extends around an entire circumference of said distal portion, said cap being positionable within said top end having said exterior surface corresponding to said distal portion frictionally engaging said inner surface of said cylinder, said lip engaging said inner surface such that said cap is removably retained on said cylinder,
      a nozzle being coupled to said outer surface of said cylinder between said top end and said bottom end, said nozzle having a distal end with respect to said outer surface, said distal end having a well extending inwardly toward said cylinder, said well having a bounding surface, said bounding surface tapering inwardly between said distal end and said cylinder,
      a pump being coupled to said inner surface of said cylinder between said top end and said bottom end whereby said pump is positioned within said cylinder, said pump having an inlet and an outlet, said inlet having a pipe extending downwardly therefrom wherein said pump is configured to urge the fluid upwardly through said pipe, said outlet being fluidly coupled to said well in said nozzle thereby facilitating said pump to urge the fluid outwardly from said nozzle,
      a mount being coupled to said outer surface of said cylinder, said mount being centrally positioned on said cylinder, said mount having an upper end and a lower end, each of said upper end and said lower end being open, said mount being substantially hollow, and
      a power supply being coupled to said cap, said power supply being electrically coupled to said pump, said power supply comprising:
         a solar panel being coupled to said top surface of said cap wherein said solar panel is configured to be exposed to solar energy, and
         a battery being positioned within said cap, said battery being electrically coupled to said solar panel such that said solar panel charges said battery, said battery being electrically coupled to said pump; and
   a support being configured to engage a support surface, said spraying unit being removably coupled to said support wherein said support is configured to support said spraying unit above the support surface, said support comprising:
      a base having a bottom side, a top side and an outermost wall extending between said bottom side and said top side, said outermost wall flaring outwardly between said top side and said bottom side, said top side having a well extending downwardly therein, said well in said base insertably receiving said bottom end of said cylinder such that said cylinder extends upwardly from said base, said bottom side being configured to abut the support surface,
      a pole having a first end and a second end, said first end of said pole being insertable into said mount on said cylinder such that said cylinder is positionable at a selected point along said pole, and
      a spike having an uppermost end and a lowermost end, said spike tapering between said uppermost end and said lowermost end wherein said lowermost end is configured to penetrate the support surface, said uppermost end insertably receiving said second end of said pole such that said cylinder is configured to be spaced above the support surface when said cylinder is not positioned within said base.

* * * * *